(12) United States Patent
Hawkins et al.

(10) Patent No.: US 8,282,017 B2
(45) Date of Patent: Oct. 9, 2012

(54) MULTIPLE CELL HEAT TRANSFER SYSTEM

(75) Inventors: Samuel David Hawkins, Lebanon, OH (US); Thomas Robert Hapner, Middletown, OH (US)

(73) Assignee: Tube Fabrication Design, Inc., Lebanon, OH (US)

( * ) Notice: Subject to any disclaimer, the term of this patent is extended or adjusted under 35 U.S.C. 154(b) by 1093 days.

(21) Appl. No.: 11/934,366

(22) Filed: Nov. 2, 2007

(65) Prior Publication Data

US 2009/0114732 A1 May 7, 2009

(51) Int. Cl.
*F24D 13/04* (2006.01)
*F24D 11/00* (2006.01)
*F24D 5/02* (2006.01)
*F28D 7/02* (2006.01)

(52) U.S. Cl. .......... 237/2 A; 237/63; 126/362.1; 122/37; 122/215; 122/234; 122/235.17; 122/249; 165/132; 219/314; 219/385; 219/439; 219/442; 219/480; 392/345; 392/452

(58) Field of Classification Search ................. 237/2 A, 237/2 B, 63; 126/362.1; 122/37, 215, 234, 122/235.17, 249, 408.1; 165/132; 219/314, 219/385, 442, 480, 441, 477; 392/345, 452, 392/481
See application file for complete search history.

(56) References Cited

U.S. PATENT DOCUMENTS

| | | | | |
|---|---|---|---|---|
| 1,239,572 A * | 9/1917 | DeKhotinsky | ............... | 392/450 |
| 2,036,815 A * | 4/1936 | Leader | .................. | 392/456 |
| 2,166,509 A * | 7/1939 | Smith | .................. | 237/2 R |
| 2,834,865 A * | 5/1958 | Coates | .................. | 392/451 |
| 3,351,130 A * | 11/1967 | Lowe | .................. | 165/132 |
| 3,353,000 A * | 11/1967 | Tomlinson | ............. | 392/492 |
| 3,363,675 A * | 1/1968 | Bierhoff | ............... | 392/341 |
| 3,370,454 A * | 2/1968 | Flores | .................. | 392/451 |
| 3,411,571 A * | 11/1968 | Thompson | ............ | 392/345 |
| 3,484,580 A * | 12/1969 | Lemuel | ............... | 392/450 |
| 3,589,437 A | 6/1971 | Shoji et al. | | |
| 3,891,817 A * | 6/1975 | Brown | .................. | 392/449 |
| 4,012,920 A | 3/1977 | Kirschbaum | | |
| 4,106,692 A * | 8/1978 | Baier | .................. | 126/400 |
| 4,157,649 A | 6/1979 | Bussjager et al. | | |
| 4,170,199 A * | 10/1979 | Minor et al. | ............ | 122/33 |
| 4,187,688 A | 2/1980 | Berg | | |

(Continued)

FOREIGN PATENT DOCUMENTS

EP 202344 A1 * 11/1986

OTHER PUBLICATIONS

Avallone, et al., Marks' Standard Handbook for Mechanical Engineers, 1996, McGraw-Hill, Tenth Edition, Section 19.1.*

*Primary Examiner* — Steven B McAllister
*Assistant Examiner* — Phillip E Decker
(74) *Attorney, Agent, or Firm* — Porter Wright Morris & Arthur

(57) ABSTRACT

A heat transfer system comprises a plurality of cells, a plurality of heating elements, and a controller for independently controlling the plurality of heating elements. The heat transfer system is capable of maintaining a fluid temperature within a predetermined range. A second pump pumps fluid through a heat exchanger in operative relationship with the blower upon a call for heat.

25 Claims, 6 Drawing Sheets

U.S. PATENT DOCUMENTS

| | | | |
|---|---|---|---|
| 4,246,956 A | | 1/1981 | Drucker |
| 4,282,421 A * | | 8/1981 | Hadar ............................ 392/452 |
| 4,353,218 A | | 10/1982 | Wheatley et al. |
| 4,367,634 A | | 1/1983 | Bolton |
| 4,390,323 A | | 6/1983 | Burnham |
| 4,392,531 A | | 7/1983 | Ippolito |
| 4,426,037 A * | | 1/1984 | Bernstein ........................ 237/19 |
| 4,469,935 A * | | 9/1984 | Candela ........................ 392/456 |
| 4,553,409 A | | 11/1985 | Furukawa |
| 4,573,635 A * | | 3/1986 | Lamphier ...................... 237/70 |
| 4,692,592 A * | | 9/1987 | Kale ............................. 392/450 |
| 4,761,964 A | | 8/1988 | Pacheco |
| 4,777,805 A | | 10/1988 | Hashizume |
| 4,918,933 A | | 4/1990 | Dyer |
| 4,940,885 A * | | 7/1990 | Challenger ................... 392/341 |
| 4,959,975 A | | 10/1990 | Harris |
| 4,971,136 A | | 11/1990 | Mathur et al. |
| 4,972,679 A | | 11/1990 | Petty et al. |
| 5,092,279 A * | | 3/1992 | Barmore ....................... 392/452 |
| 5,228,413 A * | | 7/1993 | Tam ............................ 122/15.1 |
| 5,249,436 A | | 10/1993 | Hemsath |
| 5,361,601 A | | 11/1994 | Han et al. |
| 5,473,907 A | | 12/1995 | Briggs |
| 5,548,957 A * | | 8/1996 | Salemie ........................ 60/641.8 |
| 5,628,200 A | | 5/1997 | Pendergrass |
| 5,838,879 A * | | 11/1998 | Harris ........................... 392/451 |
| 5,984,198 A | | 11/1999 | Bennett et al. |
| 6,109,339 A | | 8/2000 | Talbert et al. |
| 6,142,216 A * | | 11/2000 | Lannes ............................ 165/70 |
| 6,148,146 A * | | 11/2000 | Poore et al. ................... 392/452 |
| 6,418,745 B1 | | 7/2002 | Ratliff |
| 6,736,150 B2 * | | 5/2004 | Dolechek ...................... 134/108 |
| 6,788,884 B2 * | | 9/2004 | Reichelt ........................ 392/307 |
| 6,874,693 B2 * | | 4/2005 | Readio et al. ................. 237/2 B |
| 7,181,917 B2 | | 2/2007 | Hwang et al. |
| 7,570,877 B1 * | | 8/2009 | Huang .......................... 392/453 |
| 7,614,366 B2 * | | 11/2009 | Arnold et al. ................. 122/18.1 |

* cited by examiner

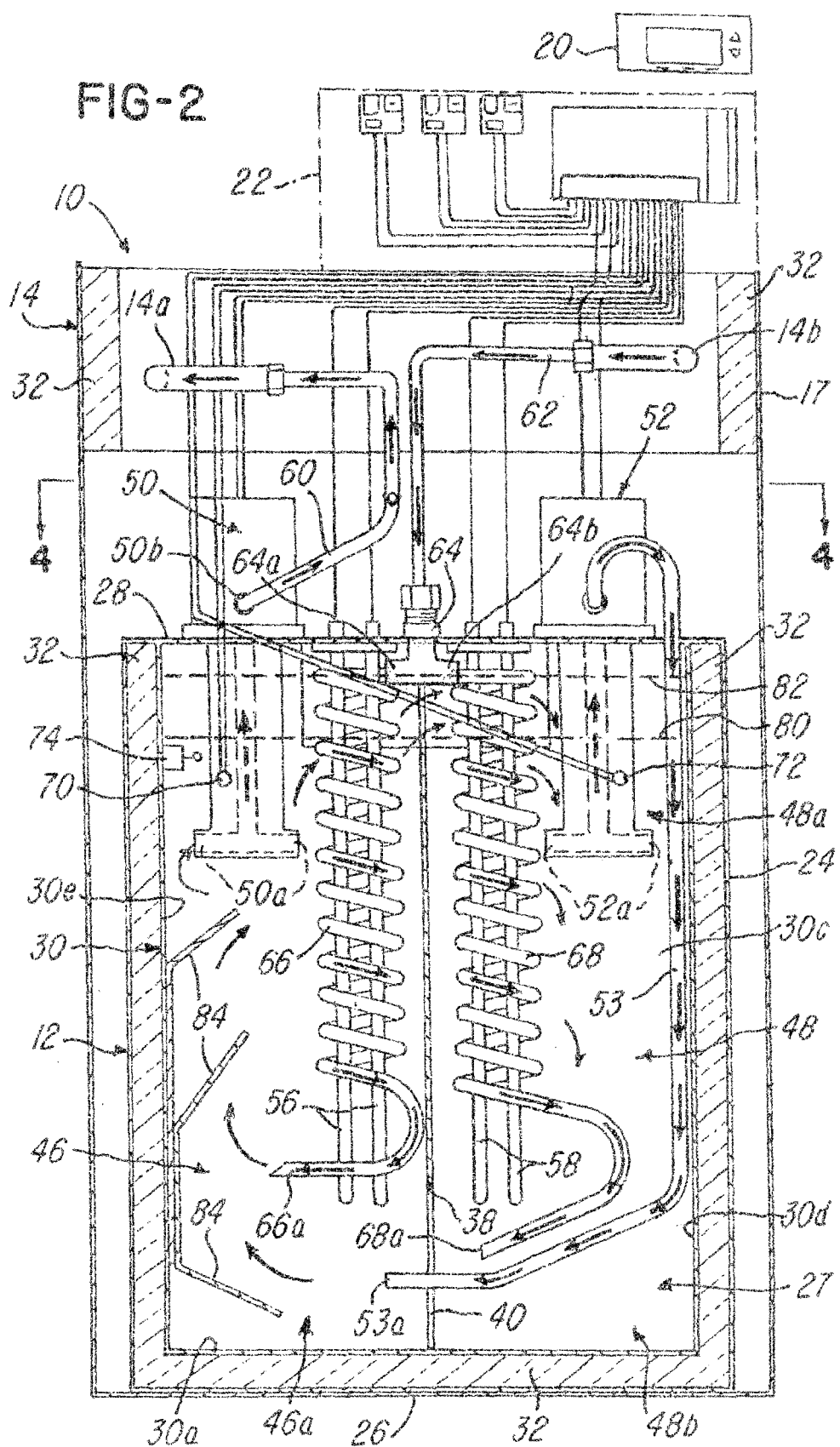

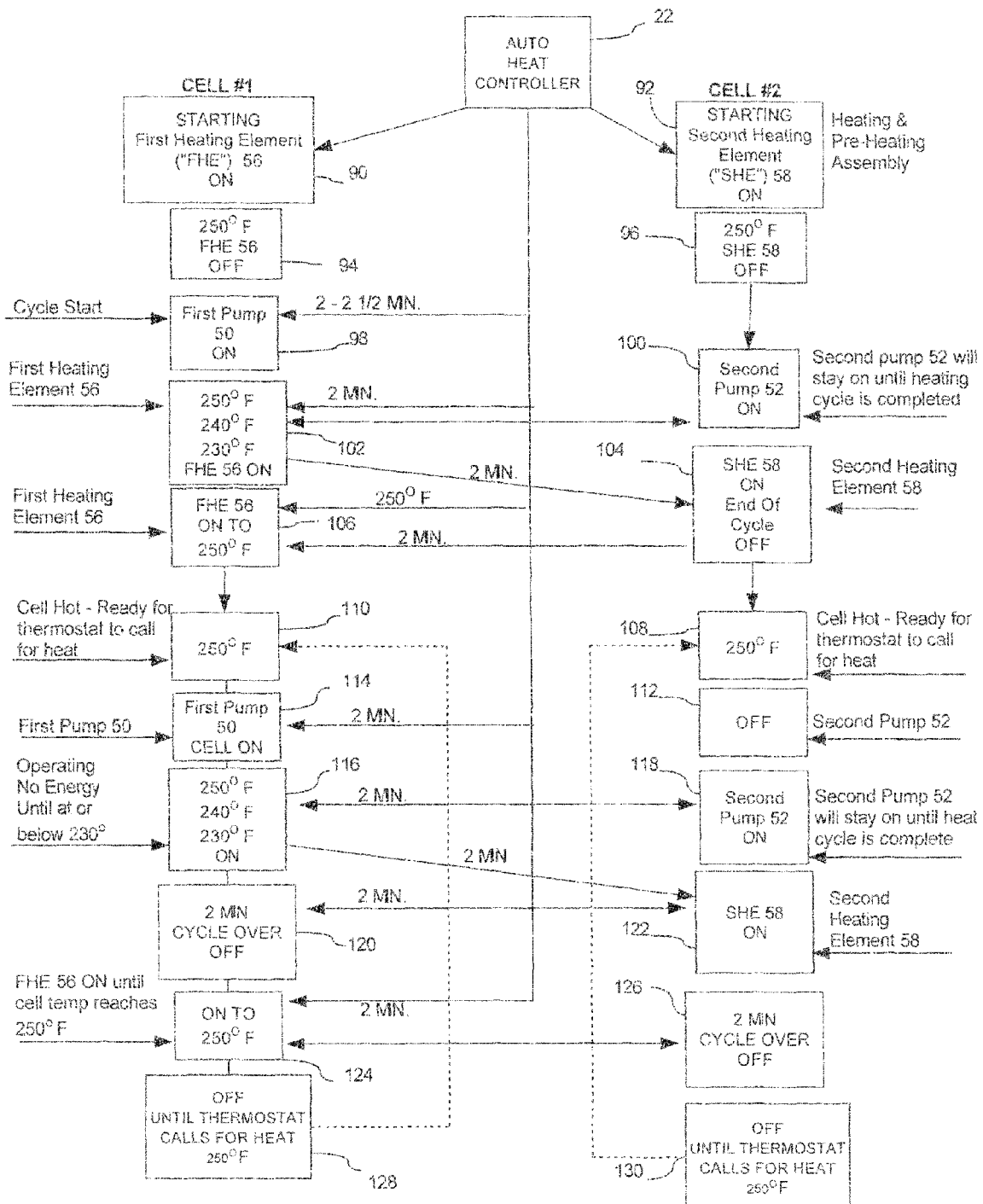

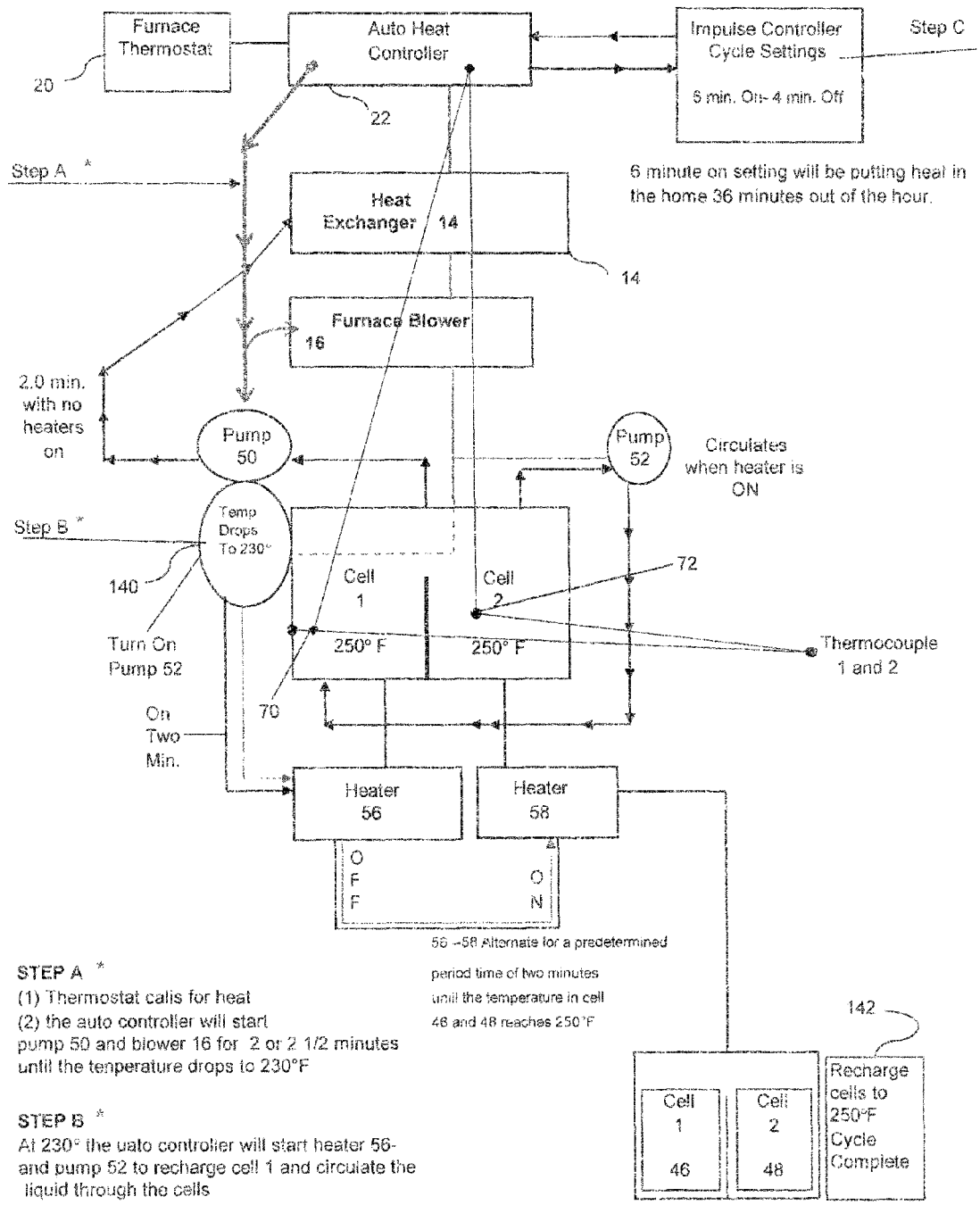

MULTIPLE CELL HEAT TRANSFER SYSTEM

BACKGROUND OF THE INVENTION

1. Field of the Invention

This invention relates to heat pumps and, more particularly, to a heat pump system and method utilizing a plurality of cells having a plurality of heating elements that are independently controlled and alternately energized to maintain a fluid temperature in the plurality of cells within a predetermined temperature range.

2. Description of the Related Art

A heat pump is a system designed to provide useful heating and cooling, and its actions are essentially the same for either process. Instead of creating heat, as does a furnace, the heat pump transfers heat from one place to another. In heating season, a liquid refrigerant, such as Freon, is pumped through a coil that is outside the area to be heated. The refrigerant is cold, so it absorbs heat from the outside air, the ground, well water, or some other source. It then flows first to a compressor, which raises its temperature and pressure so that it becomes vapor before it flows to an indoor coil. There the warmth is radiated or blown into the room or other space to be heated. The refrigerant, having given up much of its heat, then flows through a valve where its pressure and temperature are lowered further before it liquefies and is pumped into the outdoor coil to continue the cycle. To air condition a space, valves reverse the flow so that the refrigerant picks up heat from inside and discharges it outside. Like furnaces, most heat pumps are controlled by thermostats.

The two charts below show the amps and kw usage of a present day heat pump system. The outside unit draws 35 amps and when the temperature drops below 37° Fahrenheit the inside unit will start operating, drawing 60/52 amps and up to 14.4/10.8 total kw.

| Outside Heat Pump | | |
|---|---|---|
| Heil | High Efficiency | Outside Unit |
| Model No. CH5536VRC2 | Style No. 36MHD-000095ZR | |
| Serial No. L971387041 | Manufacturers No. NCH5536VKC2 | |
| AMP 35 | | |
| VOLTAGE 253MAX | | |
| Compressor PH1 | RLA 16 | LRA 100 |
| Fan HP 1/3 PH1 | FLA 1.9 | LRA 3.8 |

| Inside Heating Unit | | | |
|---|---|---|---|
| Rheem | | | |
| Model No. RHQA-1215T | | 60 HZ | 1 PH |
| Serial No. H3386 5243 | | Volts 240/280 | |
| Circuit KW | | Min. Circuit Ampacity | Max Circuit Ampacity |
| Ckt. #1 | 9.6/7.2 | 60/50 | 60/50 |
| Ckt. #2 | 4.8/3.6 | 30 | |
| Fan included in circuit #1 | | | |
| Total KW | 14.4/10.8 | Motor HP 1/3 | |
| HTR AMPS | 60.0/52. | Motor FLA 2.7 | |

Minimum Circuit supply Ampacity 80/70
Maximum Current Rating of Supply circuit Protect Device 80/70

The following is a comparison on various fuel types and associated efficiencies:

| FUEL COST COMPARISONS | | | |
|---|---|---|---|
| Cost per fuel unit × 1,000,000/btus per unit/afue = cost per million btus consumed (Source: U.S. Department of Energy) | | | |
| Fuel Type | Btu per unit (Source: U.S. Department. of Energy) | Cost per Unit | Cost per 1 million btus |
| Propane | 91,600/gallon | $2.34 | $2.34 × 1 million divided by 91,600 divided by .80 = $31.93 |
| #2 Fuel Oil | 140,000/gallon | $2.30 | $2.30 × 1 million divided by 140,000 divided by .80 = $20.53 |
| Natural Gas | 100,000/100 cubic ft | $1.69 | $1.69 × 1 million divided by 100,000 divided by .80 = $21.12 |
| Electric heat strips | 3,413/kwh | .09 | .09 × 1 million divided by 3.413 = $26.36 |
| Heat Pump HSPF 8 | 10,000/kwh 37° O.D. and 75° L.D. (Includes the indoor blower) | .09 | .09 × 1 million divided by 10,000 = $9.00 |

1) Fossil fuel figures do not include the indoor fan motor electric usage

There have been many attempts to try to improve energy efficiency, that is the efficiency with which a system provides heat compared to the energy it uses to do so. There is, therefore, a need to provide a system and method that improves over the heat pump systems and methods of the past.

SUMMARY OF THE INVENTION

One object of the invention is to provide a heat system and method that is more efficient than systems of the past.

In contrast to the prior art, the inventors have found that their system and method greatly improves the efficiency with which one heats a home or structure.

In general, a majority of heating hours are above 37 degrees Fahrenheit, which are generally suitable conditions for a heat pump to run. This means that a majority of the time, a person can heat their home for less than fifty percent of the cost of natural gas because a heat pump is more efficient than natural gas.

Another object of the invention is to provide a system and method that maintains a fluid temperature in a heat storage cells above a predetermined range.

Another object of the invention is to provide a tank having a plurality of cells and a plurality of associated heating elements, respectively, that are under control of the controller and that may independently or simultaneously control the heating elements to maintain the fluid temperature with a predetermined range.

Another object of the invention is to provide a system and method that is over 300% energy efficient.

Still another object of the invention is to provide a system and method that enables circulation of heated fluid about a plurality of heating elements in order to maintain a fluid temperature with a predetermined range.

Still another object of the invention is to provide a system and method for preheating the fluid before it is introduced into one or more cells in the tank.

Still another object of the invention is to provide a system and method for circulating the fluid within a plurality of compartments or cells within the tank and that fluid from one cell or area of a first cell is delivered to another cell or area of a second cell and mixed with fluid that is relatively colder.

One embodiment of the invention, when operating with one heating element, uses 14 amps. In extreme cold, it will use 28 amps when operating with two heating elements. See chart below for kilowatt used per cycle setting. Invention goes up to 6.0 kw. The above outside and inside units can go up to 14.4 kw. The following chart shows the advantages of the present invention's fuel efficiency compared to the prior art referred to in the Background of the Invention:

| TFD Multiple Cell Liquid Heat Pump System | | | | | |
|---|---|---|---|---|---|
| TFD | 6,600 KWH Includes the Unit Blower | | Cost per unit .09 | | Cost per 1 million btus 5.95 |
| Volts 220-240 | KW - See Chart Below Amps 14 - when operating with one heating element Amps 28 - when operating with 2 heating elements | | | | |

| Impulse Cycle Settings | | | | | |
|---|---|---|---|---|---|
| Minutes ON | | Minutes OFF | | | |
| Blower 16 and First Pump 50 | Blower 16 and First Pump 50 | Heating Minutes per Hour | KW-Used Hours | Est. Outside Temp. | Cost per Hour |
| 3 | 7 | 18 | 1.8 | 30°-up | .16 ¢ |
| 4 | 6 | 24 | 2.4 | 25° | .21 ¢ |
| 5 | 5 | 30 | 3.0 | 20° | .27 ¢ |
| 6 | 4 | 36 | 3.6 | 15° | .32 ¢ |
| 7 | 3 | 42 | 4.2 | 0° | .37 ¢ |
| 60 | 0 | 60 | 6.0 | | .54 ¢ |

In one aspect, one embodiment comprises a heat pump comprising a plurality of cells for storing heated fluid, a plurality of heating units associated with the plurality of cells, respectively, a controller for independently energizing each of the plurality of heating units when the temperature is below the predetermined setting and at least one pump for pumping fluid from a first one of the plurality of cells to a heat exchanger and for pumping fluid from a second one of the plurality of cells to the first of the plurality of cells in order to maintain a fluid temperature in at least one of the plurality of cells above a predetermined temperature.

In another aspect, another embodiment comprises a heating system comprising a heat exchanger, a blower in operative relationship with the heat exchanger, a heat pump comprising a fluid tank unit having a second cell and a first cell, a first pump for pumping fluid from the first cell to the heat exchanger and from the heat exchanger to at least one of the second cell or the first cell, a second pump for circulating fluid from between the second cell and the first cell, a first heating element situated in the first cell and a second heating element situated in the second cell, a heater for receiving fluid from the heat exchanger and for heating the fluid either before or as it is returned to the fluid tank unit, at least one sensor for sensing a temperature in at least one of the second cell or the first cell, a thermostat for setting a desired room temperature, and a controller coupled to the thermostat, the first pump, the second pump, the blower, the first heating element and the second heating element, the controller being responsive to the thermostat and controlling the first heating element and the second heating element and the second pump in order to maintain a temperature of the fluid in the fluid tank within a predetermined temperature range.

In still another aspect, another embodiment comprises a method for maintaining a fluid temperature of a fluid in a heat pump within a desired temperature range, the method comprising the steps of providing a tank unit comprising a plurality of cells that are in fluid communication with each other, each of the plurality of cells comprising a plurality of heating elements, selectively energizing the plurality of heating elements to heat the fluid in the plurality of cells, respectively, and circulating fluid from a first area of a first one of the plurality of cells to a second area of a second one of the plurality of cells.

In still another aspect, another embodiment comprises a method for controlling a heat pump comprising a first cell comprising a first heating element and a second cell comprising a second heating element, the method comprising the steps of pumping fluid from at least one of the second cell or the first cell to a heat exchanger upon a call for heat, energizing the first heating element and the second heating element in a predetermined order after an initial pumping period in order to heat the fluid, circulating fluid between the second cell and the first cell during the energizing step and heating the returning fluid before it mixes with fluid in either the second cell or the first cell.

In still another aspect, another embodiment comprises a method for heating an area, the method comprising the steps of providing a tank unit having a first cell and a second cell, the first cell and the second cell being in fluid communication, pumping fluid from the first cell through a heat exchanger associated with a blower that blows air across the heat exchanger to provide heated air to the area, and heating the fluid in a tubing coil before it mixes with fluid in either of the first cell or the second cell of the tank unit.

In still another aspect, another embodiment comprises a method for improving efficiency of a heating system, the method comprising the steps of providing a tank unit comprising a plurality of cells side-by-side, heating fluid being introduced into at least one of the plurality of cells before the fluid mixes with the fluid in the at least one of the plurality of cells, heating fluid in at least one of the plurality of cells, and causing fluid to circulate in the plurality of cells.

These and other objects and advantages of the invention will be apparent from the following description, the accompanying drawings and the appended claims.

BRIEF DESCRIPTION OF THE ACCOMPANYING DRAWINGS

FIG. 2 is a sectional enlarged view of a heat pump showing various details of the heat pump and a tank comprising a plurality of cells and the various components in accordance with one embodiment of the invention;

FIG. 4 is a top or plan view showing various details of the top surface of the heat pump showing a top surface that supports a plurality of working components such as first and second pumps, heating elements and the like;

FIG. 5A is a highly schematic view showing one illustration, with the left side of the view relating to components associated with the first cell and the right side of the view relating to components of the second cell;

Figure 6:
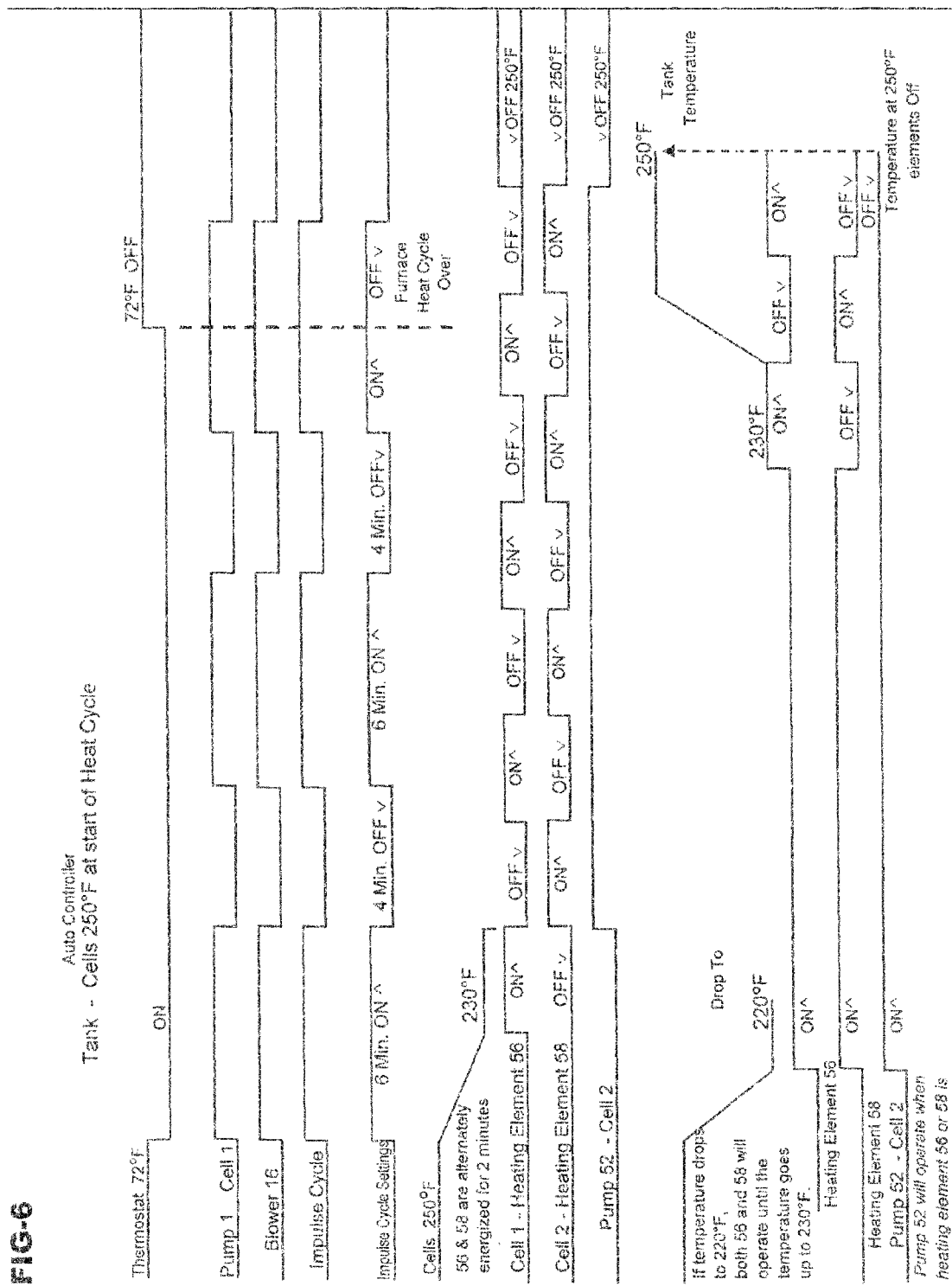

FIG. 5B is a schematic view showing another illustration of the independent operation and control of the furnace and heating elements; and FIG. 6 is a timing diagram illustrating the relative operation of various components in one illustration and showing their operation during various temperature ranges with the example utilizing an impulse cycle time setting of six minutes "on" and four minutes "off".

DETAILED DESCRIPTION OF THE PREFERRED EMBODIMENTS

Figure 1:
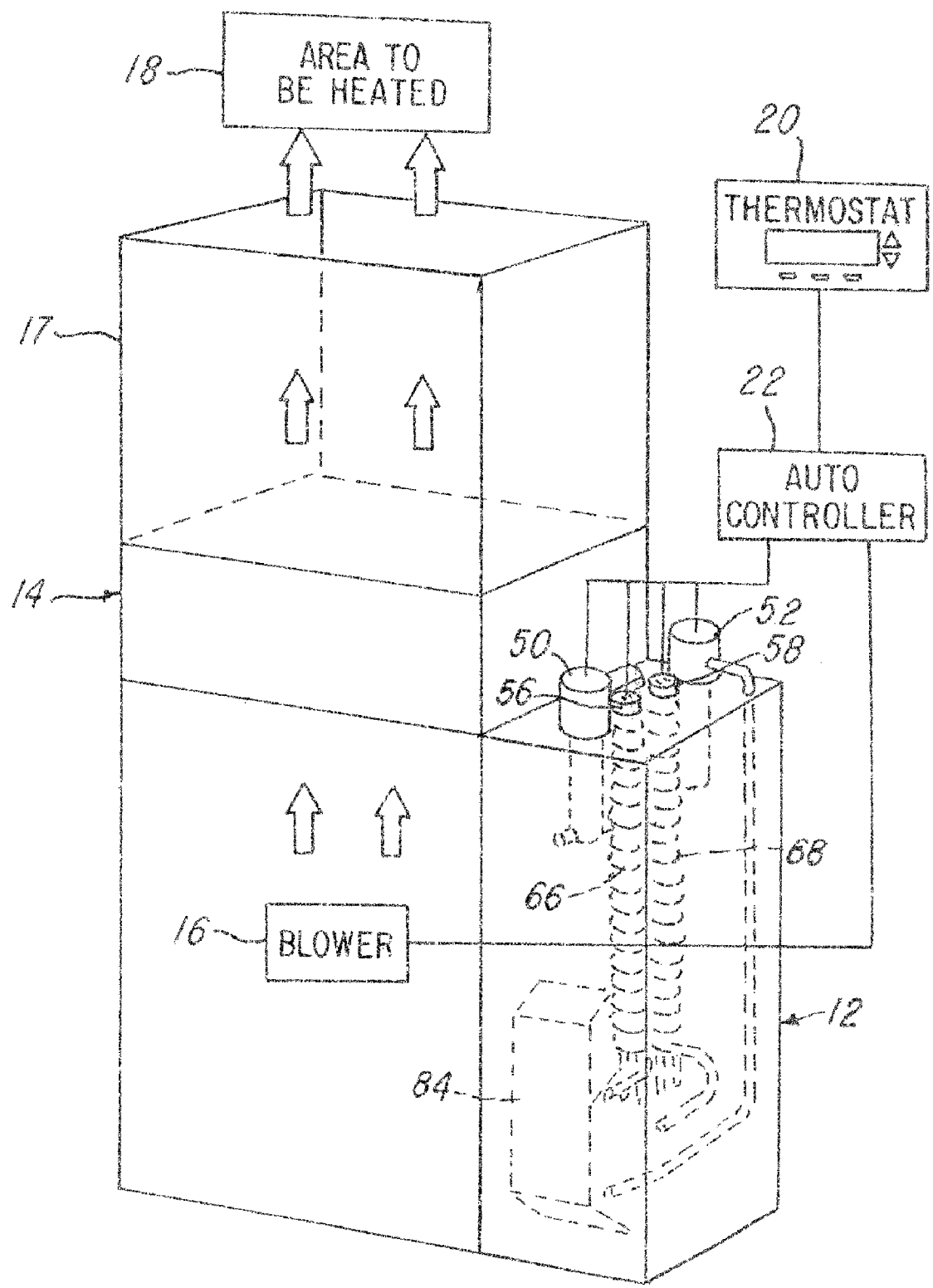
FIG. 1 is a simplified view of a heat pump in accordance with one embodiment, showing the heat pump situated adjacent a blower, heat exchanger and duct system.

Referring now to FIG. 1, a heating system 10 is shown comprising a heat pump 12 that provides heated fluid to a heat exchanger 14 that is situated in operative relationship with a blower 16. The blower 16 blows air across the heat exchanger 14 in order to heat an area 18, such as a living area inside a home or building. Note that the blower 16 and heat exchanger 14 are situated in a conduit or duct 17 in order to deliver heated air to the area 18. The blower is coupled to and under the control of auto controller 22.

The system 10 further comprises a thermostat 20 coupled to the auto controller 22 whose operation and function will be described later herein.

Referring now to FIG. 2, notice that the heat pump 12 comprises an exterior housing 24 and an interior housing or tank 30 comprising a plurality of walls 30a, 30b, 30c and 30d (FIG. 4) to which a bottom surface or wall 26 and top surface or wall 28 are secured as shown. The plurality of walls 30a, 30b, 30c and 30d define the interior 27 of a housing or tank 30 that is situated within the exterior housing 24 and separated therefrom by one inch foil-faced fiberglass insulation 32, as illustrated in FIG. 2. Model No. PT9350K1, available from McMaster Can Supply Co. of Cleveland, Ohio may be one type of foil used.

Figure 4:
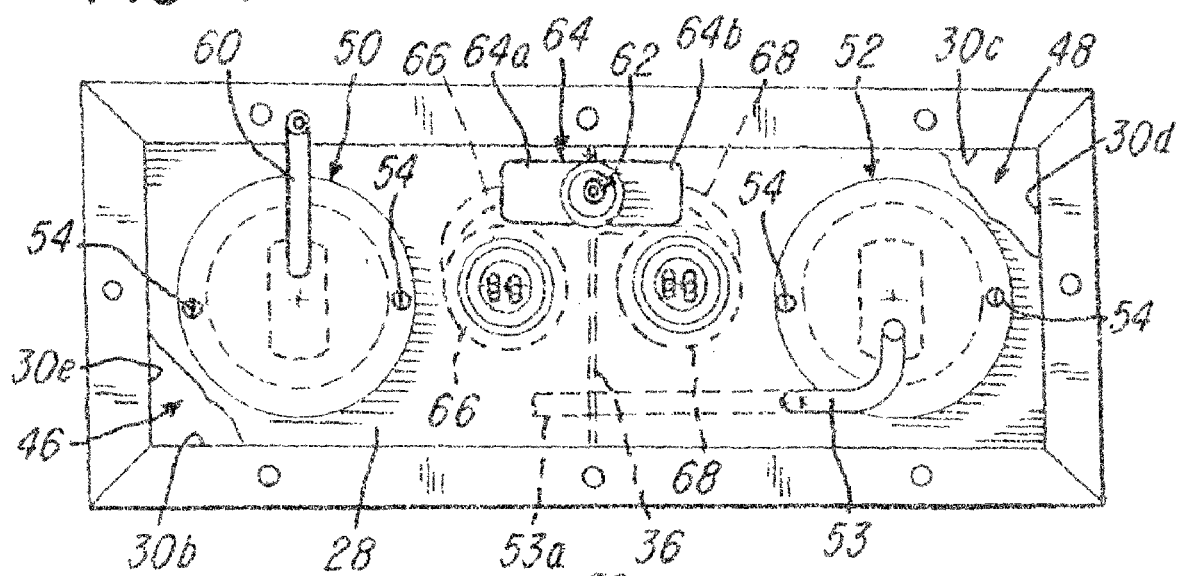
Figure 3:
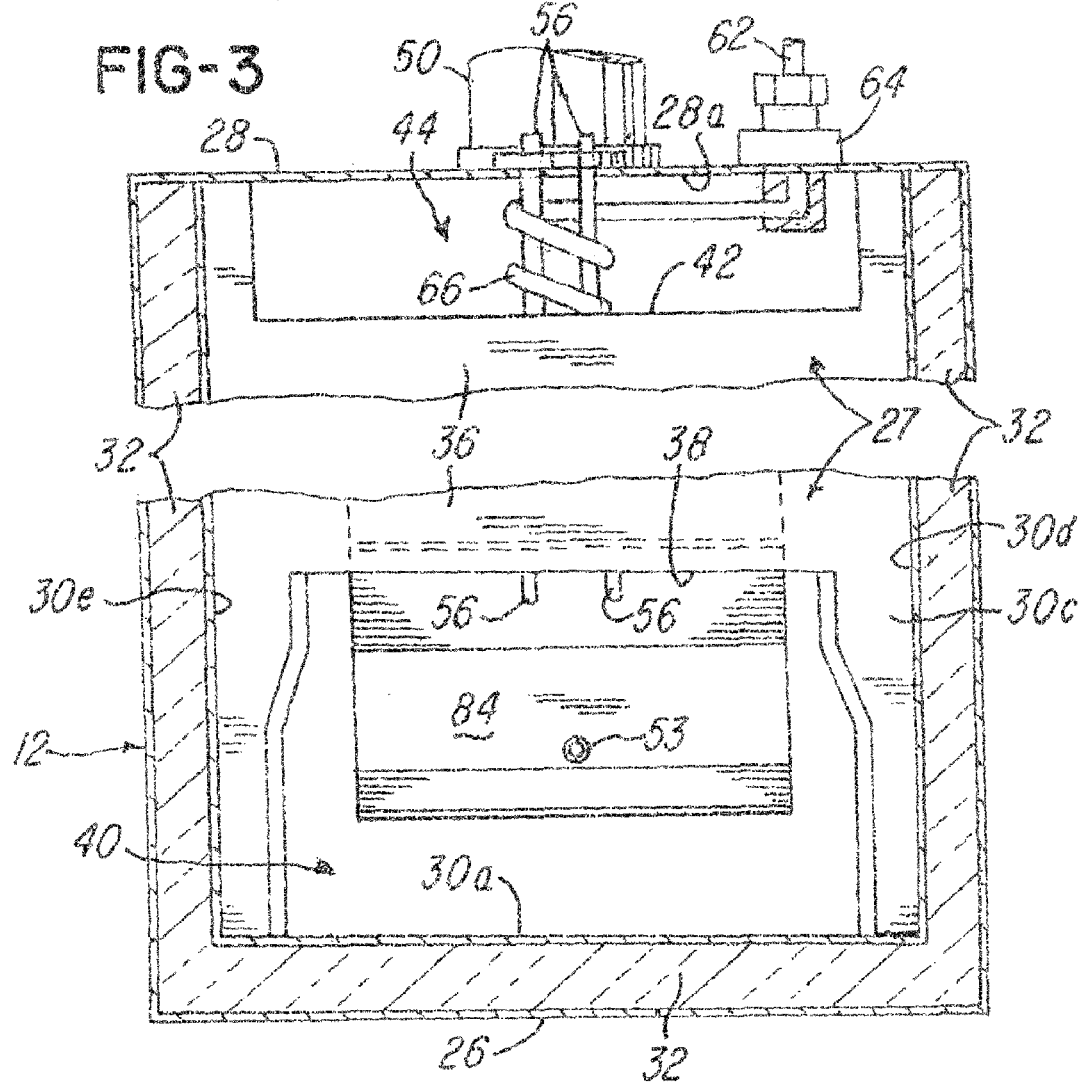
FIG. 3 is a fragmentary sectional view showing various details of a dividing wall situated between a first cell and a second cell and showing openings in the dividing wall to permit fluid circulation between the first and second cells.

As best illustrated in FIGS. 2-4, note that the plurality of walls 30a, 30b, 30c and 30d, wall 26 and wall 28 are adapted to define the generally rectangular tank 30 which is capable of storing fluid, such as heat transferring oil. In the illustration being described, the heating oil is a heat transferring oil, such as Paratherm NF, available from Paratherm Corporation of West Conshohocken, Pa., but it should be understood that other fluids, such as water, may be used as well.

A dividing wall 36 is situated between the walls 30c and 30d and secured thereto by conventional means, such as a weld. As best illustrated in FIG. 3, note that the dividing wall 36 comprises a first cut-out portion or edge 38 (FIG. 3) that cooperates with wall 30a to define a first opening 40 and a second cut-out portion or edge 42 that cooperates with surface 28a of top wall 28 to define a second opening 44. The operation and use of the first and second openings 40 and 44 will be described later herein.

As illustrated in FIG. 2, the heat pump 12 is divided into the first cell or area 46 and the second cell or area 48. The exterior housing 24, the plurality of walls 30a, 30b, 30c and 30d, dividing wall 36, and bottom surfaces or walls 26 and 28 of the heat pump 12 are made of eighteen gauge steel, which may be painted if desired. Other materials, such as stainless steel, may be used as well.

It should be understood that the wall 36 provides or defines a first cell or area 46 and a second cell or area 48 that are side-by-side, adjacent to each other, and in fluid communication. In the illustration being described, the first and second cells 46 and 48 are generally vertical as illustrated in FIG. 2.

Referring now to FIGS. 2 and 4, it should be understood that the top surface or wall 28 provides a cover, cap or seal for heat pump 12 and also provides a support on which a plurality of components may be mounted. These plurality of components will now be described.

Notice in FIG. 2 that the system 10 comprises a first pump 50 that is conventionally mounted in the surface 28 in operative and fluid relationship with the first cell 46. The system 10 further comprises a second pump 52 that is conventionally mounted in the surface 28 and in operative relationship with the second cell 48. The first and second pumps 50 and 52 are mounted to surface 28 using suitable fasteners, such as screws 54 (FIG. 4). Note that the first and second pumps 50 and 52 are coupled to auto controller 22 that controls the first and second pumps 50 and 52 in a manner described later herein.

The heat pump 12 further comprises a first heating element 56 in fluid communication with the first cell or area 46 in order to heat the fluid therein. The heat pump 12 further comprises a second heating element 58 in fluid communication with the second cell or area 48 and heats fluid therein. The first and second heating elements 56 and 58 are sealingly mounted to the top surface 28 by conventional means, such as silica. Suitable gaskets, seals (not shown), or silicon are used to provide a fluid-tight mounting of the various components onto the surface 28. The heating elements 56 and 58 are also coupled to and under the operation of the auto controller 22 and such operation will be described later herein.

In the illustration, the heating elements 56 and 58 are 3500 watt electric heating assemblies and may be model number SPIL 29347 available from ASB of Toronto, Ontario, Canada. The first and second pumps 50 and 52 are model number 5380-95 available from Ohio Transmission and Pump of Middletown, Ohio. The auto controller 22 is available from Tube Fabrication Design, Inc. of Lebanon, Ohio, the Assignee hereof.

Note that the first pump 50 (FIG. 2) pumps fluid from a fluid inlet 50a to an outlet 50b through a conduit 60 into an inlet conduit or coupling 14a of heat exchanger 14. After the heated fluid is pumped through the heat exchanger 14, it returns through an outlet conduit or coupling 14b of heat exchanger 14 into a conduit 62 and returns to a manifold 64 that is sealingly mounted to the top surface or wall 28.

The manifold 64 has a first outlet 64a coupled to a first tubular coil 66 and a second outlet 64b coupled to a second tubular coil 68 as shown. Notice that the first and second tubular coils 66 and 68 are arranged in a spiral or helix around the first and second heating elements 56 and 58, respectively, as illustrated in FIGS. 2 and 4. In the illustration being described, each of the tubular coils 66 and 68 comprise approximately 120 inches of three-eighths inch copper coil that is coiled in a spiral or helix about each of the heating elements 56 and 58. Each of the tubular coils 66 and 68 is approximately 120 inches long and is submerged in the fluid resident or stored in the first cell 46 and second cell 48.

As mentioned, the tubular coils 66 and 68 are arranged in a helix about the heating elements 56 and 58, respectively, so that fluid passing through the tubular coils 66 and 68 becomes heated before the fluid is introduced into the first cell or area 46 and the second cell or area 48. Thus, it should be understood that as cooled fluid is returned from the heat exchanger 14, the fluid becomes preheated as it passes through the tubular coils 66 and 68 and before the fluid is reintroduced to and mixed with the fluid stored in the first and second cells 46 and 48, respectively. Consequently, the heating elements 56 and 58 are performing multiple functions: heating the fluid in the first and second cells 46 and 48, respectively; and preheating fluid before it is introduced into the first and second cells 46 and 48.

Notice that the system 10 further comprises a first thermocouple 70 associated with the first cell 46 and second thermocouple 72 associated with the second area 48. The first and second thermocouples 70 and 72 are operatively coupled to auto controller 22 and provide fluid temperature information regarding the fluid in the first and second cells 46 and 48, respectively.

The heat pump 12 further comprises a safety liquid level control 74 (FIG. 2) that monitors the fluid level in the heat pump 12. The safety liquid level control 74 is coupled to auto controller 22 and if the fluid drops below a predetermined minimum level, then the safety liquid level control 74 generates a low level signal which is received by auto controller 22 which may respond by, among other things, turning off the first and second pumps 50 and 52 and the heating elements 56 and 58. In the illustration, the safety liquid level control 74 is a model number available from Tube Fabrication Design of Lebanon, Ohio.

In the illustration being described, at ambient temperature, the fluid is at a first, ambient or cold fluid level 80 (FIG. 2) wherein the fluid is typically at ambient temperature. As the fluid in the heat pump 12 is heated, the fluid expands and may reach a fluid level 82 wherein the fluid temperature may be at a predetermined maximum temperature, which for illustration will be on the order of about 250 degrees Fahrenheit. During operation, the fluid level fluctuates between the cold fluid level 80 and the fluid level 82. The fluid levels 80 and 82 may be higher or lower if desired and will depend on the fluid type, amount of fluid in the tank 30 and the predetermined maximum temperature.

Notice in FIG. 2 that the wall 30e may comprise a plurality of baffles 84 secured thereto, such as by weld. The plurality of baffles 84 facilitate circulation and disturbing the fluid flow as the fluid is introduced into the first cell 46 as described herein. The plurality of baffles 84 facilitate heating the fluid circulating therein. The operation and method of heating the fluid will now be described.

A brief overview of the fluid circulation and heating will be described relative to FIG. 2, and a more detailed explanation of the control procedure and operation of the auto controller 22 will be described later herein relative to FIGS. 4 and 6. Various temperature ranges, fluid quantities pump flow will be discussed for illustrative purposes, but it should be understood that these are non-limiting examples and may vary.

Fluid is stored in the first and second cells 46 and 48 of tank 30, and the fluid level in the first cell 46 and second cell 48 is maintained between the fluid levels 80 and 82. In the illustration being described, the fluid begins at the cold or ambient fluid level 80, and after it is heated, it achieves the fluid level 82. It is important to note that the fluid level 82 is vertically below the surface 28a and the various components mounted thereon.

The thermostat 20 is situated in the area 18 wherein the temperature is to be controlled. As illustrated in FIGS. 1, 2 and 5, note that the thermostat 20 is coupled to the auto controller 22. During operation, a user sets the thermostat 20 to a desired temperature, such as seventy-two degrees Fahrenheit. The user also inputs into the auto controller 22 an impulse cycle time setting ("ICT setting"), which generally corresponds to a period of "on" time and "off" time. The "on" cycle time is the period of time that the auto controller 22 energizes first pump 50 and blower 16. The "off" time is the time the auto controller 22 will cause first pump 50 and blower 16 to be off.

The ICT setting also correlates to a temperature outside (that is, out of doors) of the area 18. An ICT setting of six minutes "on" and four minutes "off" will be used for illustration purposes. If conditions outside the area 18 are colder or warmer, for example, a different ICT setting may be used. For example, if it is colder outside, the ICT setting may be eight minutes "on" and two minutes "off". If it is warmer outside the area 18, a shorter ICT setting (e.g., two minutes "on", eight minutes "off") may be used.

Thus, auto controller 22 cycles several components including second pump 52, first heating element 56 and second heating element 58 "on" and "off" in a predetermined order to maintain the fluid temperature in the tank within a desired range to heat the area 18 in accordance with the thermostat 20 setting. In contrast, the auto controller 22 uses the ICT setting, which is set by the user and only controls the impulse (on and off time) of the furnace (i.e., the first pump 50 and blower 16). An illustrative ICT settings chart is as follows:

| Impulse Cycle Settings | | | | | |
|---|---|---|---|---|---|
| Minutes Blower 16 and First Pump 50 ON | Minutes Blower 16 and First Pump 50 OFF | Heating Minutes Per Hour | KW-Used Horse | Est. Outside Temp. | Cost per Hour |
| 3 | 7 | 18 | 1.8 | 30°-up | .16 ¢ |
| 4 | 6 | 24 | 2.4 | 25° | .21 ¢ |
| 5 | 5 | 30 | 3.0 | 20° | .27 ¢ |
| 6 | 4 | 36 | 3.6 | 15° | .32 ¢ |
| 7 | 3 | 42 | 4.2 | 0° | .37 ¢ |
| 60 | 0 | 60 | 6.0 | | .54 ¢ |

The minutes per hour ("MPH") does not control the heating elements 56 and 58. The auto controller 22 controls the heating elements 56 and 58 using the thermocouples 70 and 72. For example, if a six minute "on", four minute "off" ICT setting is used, then the total heating minutes per hour will be 36 (six minutes "on" every 10 minutes, means 6 six minute "on" cycles). The KW-per hour electric consumption of the heating elements 56 and 58 may change depending upon the heating elements 56 and 58 being used.

Note that all the ICT setting cycles are a total of ten minutes in the illustration, but a longer or shorter total cycle time may be selected. For ease of description, it will be assumed that a ten minute ICT setting is used with a six minute "on" ICT setting and a four minute "off" ICT setting.

The thermostat 20 is set by the user and this information is received by auto controller 22. Auto controller 22 senses the fluid temperature in the first cell 46 and second cell 48 using the thermocouples 70 and 72, respectively. In response to the temperature reading from the thermocouples 70 and 72, if the fluid in these first and second cells 46 and 48 is at an ambient temperature that is below a predetermined absolute minimum temperature, then the auto controller 22 energizes both the first and second heating elements 56 and 58 until the fluid temperature reaches the predetermined minimum temperature, which will be presumed to be 230 degrees Fahrenheit in this illustration. In the illustration being described, the predetermined maximum temperature will be assumed to be 250 degrees Fahrenheit.

The auto controller 22 energizes the second pump 52 which will remain on whenever at least one of the first or second heating elements 56 and 58 is energized. Note that when the second pump 52 is energized, it receives fluid at a pump inlet 52a and pumps the fluid through a pump conduit 53 which delivers the fluid to an outlet 53a and into the first cell 46 as illustrated in FIG. 2. Thus, note that as the second pump 52 pumps, it pumps fluid from an upper area 48a of the second cell 48 to a lower area 46a of the first cell 46. Note that the end 53a of the tube projects through the first opening 40 in the wall 34. It should be understood that the second pump 52 is pumping heated fluid from the upper area 48a whose fluid in this upper area 48a is typically hotter than the fluid in a lower or bottom area 48b of the second cell 48. As the fluid is delivered to the lower area 46a of the first cell 46, the temperature difference, along with the flow of the fluid cause the fluid to rise and circulate back into the second cell 48 through the second opening 44 (FIG. 3) of the wall 34. The plurality of baffles 84 (FIG. 2) facilitate disturbing the flow and causing the fluid introduced into the first cell 46 to be mixed with the fluid stored therein.

During this initial heating cycle the auto controller 22 energizes both the first heating element 56 and second heating element 58 until the predetermined minimum temperature is achieved. After the predetermined minimum temperature level is exceeded, but before the fluid temperature reaches the predetermined maximum temperature, the first and second heating elements 56 and 58 are toggled or selectively and alternately energized by auto controller 22.

When the temperature of the fluid in the first cell 46 and second cell 48 reaches the predetermined maximum temperature (250 degrees Fahrenheit in the illustration), the auto controller 22 ceases energizing the first and second heating elements 56 and 58 and second pump 52. A brief illustration will now be described.

Referring to FIG. 2, upon a call for heat to area 18 by thermostat 20, the fluid in the first cell 46 is pumped by first pump 50 from a pump inlet 50a through the conduit 60 and into the coupling 14a of the heat exchanger 14. The fluid is pumped through the heat exchanger 14. Substantially simultaneously, auto controller 22 energizes the blower 16 (FIG. 1) so that air is blown across the heat exchanger 14 and heated air is blown through the duct 17 and into the area 18 to be heated. The fluid in the heat exchanger 14 returns to the coupling 14b and into the conduit 62 which returns the fluid to the manifold 64. The manifold 64 delivers the fluid into the tubular coils 66 and 68 as shown. The fluid passes through the tubular coils 66 and 68 and is delivered to outlet 66a and outlet 68a, which delivers the fluid into the first cell 46 and second cell 48, respectively. The fluid becomes heated or even preheated before the fluid is reintroduced into the first cell 46 or second cell 48. In this regard, notice that the tubular coils 66 and 68 are spirally or helically situated about the heating elements 56 and 58, respectively, and are in close proximity thereto. In the illustration being described, the tubular coils 66 and 68 are copper and absorb heat from both the heating elements and the surrounding fluid in the first cell 46 and second cell 48.

As the fluid passes through the tubular coils 66 and 68, the fluid becomes preheated between the heat exchanger 14 and before being returned to the heat pump 12 and reintroduced into the first cell 46 or second cell 48. Thus, the heating elements 56 and 58 operate to heat not only the fluid stored in the first cell 46 and second cell 48, respectively, but also heat the tubing coils 66 and 68. This fluid passing through the tubing coils 66 and 68 becomes preheated before it is reintroduced into a first cell 46 and second cell 48, respectively.

It should further be understood that as the heated or preheated fluid is received in the first cell 46 and the second cell 48 from the tubing coils 66 and 68, respectively, the heated fluid is caused to circulate or flow from the lower area 46a of first cell 46 and bottom area 48b of second cell 48 through the first cell 46 and circulate through the second opening 44 (FIG. 3) and back into the second cell 48. The fluid in the first cell 46 and second cell 48 is continuously circulated between the first cell 46 and the second cell 48 whenever either the first pump 50 or second pump 52 is energized. As mentioned, the second pump 52 remains energized when either of the first heating element 56 or second heating element 58 is energized.

During an initial start up period, the first pump 50 is energized for an initial period of two and one half minutes upon any call for heat from thermostat 20 and the auto controller 22 causes second pump 52 and heating elements 56 and 58 to remain off.

The system 10 starts with fluid in first and second cells 46 and 48 being at ambient temperature. After an initial warm-up period of, for example, two to two and one half minutes in the illustration being described, and assuming the fluid temperature in the first cell 46 and second cell 48 remains below a predetermined maximum temperature, such as 250 degrees Fahrenheit in the illustration, and above a predetermined minimum temperature, such as 230 degrees Fahrenheit in the illustration, auto controller 22 alternately energizes the first and second heating elements 56 and 58. When the temperature falls below the predetermined minimum temperature, such as 230 degrees Fahrenheit, auto controller 22 energizes the first heating element 56 for a predetermined period, such as two minutes. After the two minute period, auto controller 22 ceases energizing the first heating element 56 and energizes the second heating element 58 for a period of two minutes. After the second heating element 58 is energized for a period of two minutes, the auto controller 22 ceases energizing the second heating element 58 and reenergizes the first heating element 56.

It should be understood that if during the initial six minutes ICT "on" time (i.e., during any of the two minute cycles during which the auto controller 22 energizes either the first heating element 56 or the second heating element 58) the temperature of the fluid in the first cell 46 or second cell 48 reaches or exceeds the predetermined maximum temperature (250 degrees Fahrenheit in the illustration), then auto controller 22 ceases energizing second pump 52, the first heating element 56 and second heating element 58.

Note, however, that upon or during a call for heat from thermostat 20, auto controller 22 continues energizing first pump 50 and blower 16 to provide heat to the area 18 until the temperature in the area 18 reaches the desired thermostat 20 temperature, which is 72 degrees Fahrenheit in the illustration being described. During any impulse "on" cycle (6 minutes in this illustration), auto controller 22 will cause the blower 16 and first pump 50 to impulse for the designated period, unless the thermostat ceases calling for heat in which case auto controller 22 ceases energizing the blower 16 and first pump 50. On the other hand, even though the thermostat 20 continues to call for heat during the "off" cycle (4 minutes in this illustration), the auto controller 22 will cease energizing the blower 16 and first pump 50. So it should be understood that auto controller 22 will cease energizing the blower 16 and first pump 50 whenever the thermostat 20 does not call for heat, but will energize the blower 16 and first pump 50 in accordance with the impulse cycle setting whenever there is a call for heat.

Moreover, if the temperature in the area 18 reaches or exceeds the desired temperature of 72 degrees Fahrenheit in the illustration, the auto controller 22 ceases energizing the first pump 50, but may cause the second pump 52 and one or more of the heating elements 56 and 58 to remain energized or alternately energized in the manner described herein until the fluid temperature of the fluid in the first cell 46 and the second cell 48 equals or exceeds the predetermined maximum temperature, which is 250 degrees Fahrenheit in this illustration.

Thus, it should be understood that the fluid temperature of the fluid in the first cell 46 and second cell 48 is maintained and the fluid is caused to be cycled by the second pump 52 independent of the operation of the first pump 50 and blower 16. Consequently, while the blower 16 and the first pump 50 may not be energized, the second pump 52 and one or more of the heating elements 56 and 58 may be operating. Likewise, if the temperature of the fluid in the first cell 46 and second cell 48 is above the predetermined minimum temperature, 230 degrees Fahrenheit in the illustration being described, and the temperature in the area 18 is below the desired temperature (72 degrees Fahrenheit in the illustration being described), then auto controller 22 may cause the second pump 52 and one or more of the first and second heating elements 56 and 58 to be energized while the auto controller 22 substantially simultaneously energizes the blower 16 and first pump 50.

As the fluid loses heat by circulating through the heat exchanger 14, the temperature of the fluid will ultimately fall below the predetermined minimum temperature, which is 230 degrees Fahrenheit in the illustration and this temperature will be sensed by the thermocouples 70 and 72. In response, the auto controller 22 will energize the second pump 52 and will alternately energize the first and second heating elements 56 and 58 for the predetermined heating periods, such as two minutes in the illustration being described. If the temperature of the fluid falls below a predetermined absolute minimum temperature, which in the illustration being described is 220 degrees Fahrenheit, then one alternate embodiment calls for the auto controller 22 to simultaneously energize both the first heating element 56 and the second heating element 58. Thus, for example, if at any time the fluid in the first cell 46 or second cell 48 reaches the predetermined absolute minimum temperature, which in the illustration being described is 220 degrees Fahrenheit, then the auto controller 22 energizes the second pump 52 and both heating elements 56 and 58 in order to heat the fluid.

In general, however, during normal operation when the fluid temperature is above the predetermined minimum temperature (such as 230 degrees Fahrenheit) and below the predetermined maximum temperature (such as 250 degrees Fahrenheit), the auto controller 22 will cause the first and second heating elements 56 and 58 to be alternately energized for the predetermined energizing period of two minutes in the illustration being described. The first and second heating elements 56 and 58 are energized for two minutes each.

It should be understood that after the fluid in the first cell 46 and second cell 48 has achieved the predetermined maximum temperature, which in the embodiment being described is 250 degrees Fahrenheit, auto controller 22 ceases energizing the second pump 52 and the first and second heating elements 56 and 58. If during this off heating time there is a call for heat because the temperature in the area 18 falls below the thermostat 20 temperature as set by the user, then auto controller 22 will energize the first pump 50 which circulates fluid from the first cell 46, through the heat exchanger 14 and back into the first and second cells 46 and 48 through the tubular coils 66 and 68, respectively, as described herein. Auto controller 22 will not energize second pump 52 and first and second heating elements 56 and 58 until the fluid temperature falls below or equals the predetermined minimum temperature (230 degrees Fahrenheit) in the illustration.

Thus, when a temperature of the fluid in the first cell 46 or second cell 48 falls from the predetermined maximum temperature to the predetermined minimum temperature, 230 degrees Fahrenheit in the illustration being described, then the auto controller 22 energizes the second pump 52 which begins circulating the fluid between the first and second cells 46 and 48. Auto controller 22 also alternately energizes the first heating element 56 for the predetermined time, which is two minutes in the illustration being described. After the initial two minute period, auto controller 22 ceases energizing the first heating element 56 and energizes heating element 58 for the predetermined time (that is, two minutes in the illustration). Auto controller 22 then ceases energizing the second heating element 58 and again energizes the first heating element 56, thereby completing the six minute cycle in the illustration. Auto controller 22 will keep alternately energizing first heating element 56 and second heating element 58 until the temperature of 250 degrees Fahrenheit is met.

Again, it should be understood that the auto controller 22 toggles or alternately energizes the first heating element 56 and second heating element 58 when the temperature in the first or second cell 46 or 48 falls below the predetermined setting.

It should be understood that the ICT setting does not control the heating and pumping functions within the tank of the unit, but rather, the ICT settings control the impulsing of the furnace (i.e., blower 16 and first pump 50). The inventors have found impulsing the furnace six (6) times per hour, as shown in the illustration, is to keep the temperature and air circulation in the home or structure more even compared to conventional furnace systems that are energized when the room temperature falls below the thermostat temperature. This causes air to circulate in the home or structure and also facilitates the use of a constant speed fan, as opposed to a variable speed fan.

It should be understood that the auto controller 22 toggles or alternately energizes the first heating element 56 and second heating element 58 when the first or second cell 46 or 48 temperature is below the predetermined setting, and this operation is independent of the operation of the ICT and blower 16 operation. This independent operation is described later herein relative to FIG. 5B.

After the auto controller 22 toggles or alternately energizes each of the heating elements 56 and 58 for the predetermined period (two minutes in the illustration) and the fluid temperature reaches 250 degrees Fahrenheit, the auto controller 22 ceases energizing the second pump 52, first heating element 56 and second heating element 58.

Thus, it should be understood that the heating of the fluid to the desired temperature (e.g. 250° Fahrenheit) overrides or is independent the of ICT settings. For example 4, the temperature of the fluid is less than 250 degrees Fahrenheit, but the ICT setting "on" time has expired, the auto controller 22 continues to alternately energize the first and second heating elements 56 and 58 until the fluid temperature reaches 250 degrees Fahrenheit, even though the auto controller 22 does not energize the furnace (blower 16 and first pump 50). Auto controller 22 will not energize the blower 16 and first pump 50 until the next "on" cycle time, even though one or both of the heating elements 56 and 58 have been energized.

Again, it should be understood that the auto controller 22 independently controls the heating of the fluid in the first cell 46 and second cell 48 and second pump 52 to maintain a fluid temperature of the fluid within a predetermined range (230 degrees to 250 degrees Fahrenheit in the illustration being described) and substantially simultaneously controls the heating of the area 18 by independently controlling the first pump 50 and the flow of the heated fluid through the heat exchanger 14 and the operation of the blower 16.

During normal operation, the heat pump 12 alternately operates each of the first and second heating elements 56 and 58 using approximately fourteen amperes and two to three kilowatts per hour depending on the heat loss out of the area 18. In extreme cold conditions, when the temperature of the fluid in the first or second cells 46 and 48 falls below the predetermined absolute minimum temperature (220 degrees Fahrenheit), the auto controller 22 may substantially simultaneously energize both the first and second heating elements 56 and 58 and second pump 52 until the fluid temperature reaches the predetermined minimum temperature of 230 degrees Fahrenheit. Thereafter, the auto controller 22 energizes second pump 52 and alternately energizes the first and second heating elements 56 and 58.

FIG. 5A is a schematic diagram illustrating the features described herein. Note that the auto controller 22 receives information from the thermostat 20 and the ICT setting which in the illustration is six minutes on and four minutes off. In this illustration, it will be assumed that the fluid is cold (i.e., at room temperature). Notice that the process begins at blocks 90 and 92 and if the fluid temperature is cold, auto controller 22 energizes both the first and second heating elements 56 and 58. If the fluid temperature in the first and second cells 46 and 48 is at or above 250 degrees Fahrenheit, auto controller 22 does not energize either of the heating elements 56 or 58 in the illustration.

Assuming that there is a call for heat (block 98 in FIG. 5A) auto controller 22 energizes first pump 50 to pump fluid through the heat exchanger 14. Initially auto controller 22 may energize first pump 50 for a predetermined time period, such as 2 to 2½ minutes in the illustration. As mentioned later herein, it should be noted that the first pump 50 is operating and pumping heated fluid through the heat exchanger 14 without any heat being added to the fluid by the first and second heating elements 56 and 58. If the temperature in the first or second cells 46 or 48 falls below 230 degrees Fahrenheit then the auto controller 22 toggles or alternately energizes heating elements 56 and 58 at blocks 102, 104 and 106. Note that during the time period when either of the first or second heating elements is on, auto controller 22 energizes second pump 52.

The routine continues at block 114 upon a call for heat and the auto controller 22 again energizes the first pump 50 for an initial period, such as two minutes in the illustration (block 114). The routine continues and if the fluid temperature in the first and second cells 46 and 48 falls below the predetermined minimum temperature, such as 230 degrees Fahrenheit, then the auto controller 22 will again toggle or alternately energize the first and second heating elements 56 and 58 (blocks 116, 120 and 122). Again, note at block 118 that during the time period when either of the first or second heating elements 56 and 58 are on, the auto controller 22 energizes the second pump 52 which causes the fluid to circulate between the first and second cells 46 and 48.

In one variation, if the temperature in the first and second cells 46 and 48 has not reached the predetermined maximum temperature, then auto controller 22 may energize one or both of the first and second heating elements 56 and 58. For example, in the illustration note at block 124 that auto controller 22 continues to energize the first heating element 56 for a predetermined period such as two minutes and that the end of that two minute cycle, auto controller 22 ceases energizing the first heating element 56 (block 126). Auto controller 22 alternately energizes the heating elements 56 and 58 (blocks 128 and 130).

In the illustration being described and as mentioned earlier, if the temperature in the first and second cells 46 and 48 falls below a predetermined minimum temperature such as 220 degrees in the illustration, then auto controller 22 may cause both of the first and second heating elements 56 and 58 to be energized in order to bring the temperature up to the predetermined minimum temperature of 230 degrees, whereupon the auto controller 22 will then alternately energize the first and second heating elements 56 and 58 in the manner described herein.

Independently of the operation of the energization of the heating elements 56 and 58, the auto controller 22 energizes the blower 16 and first pump 50 and this operation will now be described.

Turning now to FIG. 5B, further details are provided concerning the independent operation of the first and second heating elements 56 and 58 and the blower 16. In this illustration the same ICT setting will be assumed to be six minutes "on" and four minutes "off", which means that the auto controller 22 will energize the blower 16 and the first pump 50 for a total of thirty-six minutes out of every hour of operation. Note that because the auto controller 22 energizes the blower 16 for six minutes "on" and four minutes "off", a more consistent and even circulation of airflow in the home or structure is provided. This facilitates reducing or eliminating the need for a variable motor blower. As mentioned earlier, the ICT setting is independent of the operation of the first and second heating elements 56 and 58 so that while auto controller 22 may cause the blower 16 and first pump 50 to be energized, one or both of first and second heating elements 56 and 58 are operated independently of the ICT setting.

In the illustration being described, when the thermostat 20 calls for heat, auto controller 22 will energize first pump 50 and blower 16 for a predetermined start period, such as two or two and one half minutes in the illustration being described, until the temperature of the fluid in either the first cell 46 or second cell 48 drops to or below 230 degrees Fahrenheit When the thermocouple 70 or 72 senses that the temperature of the fluid in the first cell 46 or second cell 48, respectively, has reached or dropped below 230 degrees Fahrenheit.

At bubble 140, note that if the temperature drops to 230 degrees Fahrenheit or below, the auto controller 22 will energize the first heating element 56 and substantially simultaneously energize the second pump 52 which causes the fluid to be circulated between the first cell 46 and second cell 48 in the manner described earlier herein. As shown at the bottom of the illustration, the auto controller 22 alternately energizes the first heating element 56 and the second heating element 58 for the predetermined period of time, which in the illustration being described is two minutes, until the temperature in the first and second cells 46 and 48 reaches 250 degrees Fahrenheit. After the temperature of the fluid in the first cell 46 and second cell 48 is recharged to 250 degrees Fahrenheit (block 142 in FIG. 5B), the heating cycle is complete. It should be understood that if at the end of a recharge cycle, the thermostat 20 is still calling for heat, then the cycle loops back as shown and auto controller continues to energize blower 16 and first pump 50 according to the ICT setting until the temperature of thermostat 20 is met.

Thus, it should be understood that the steps of energizing the first pump 50 and blower 16 for the initial predetermined period and during the ICT "on" period and the second operation of energizing the first heating element 56 and the second heating element 58 together or alternatively along with the second pump 52 to recharge or reheat the first and second cells 46 and 48, will continue until the temperature setting of the thermostat 20 is achieved.

In Impulse Cycle Setting, 6 minutes ON—4 minutes OFF, the auto controller 22 will impulse first pump 50 and blower 16 according to the cycle setting. The auto controller 22 will not override the 4 minutes off time if the thermostat is still calling for heat.

To further facilitate understanding the process and operation, a timing diagram is shown in FIG. 6 illustrating the "on" and "off" cycles for various components during various temperature settings.

Advantageously, it should be understood that when the thermostat 20 calls for heat to be delivered to the area 18, the heat pump 12 will start pumping the heating fluid using the first pump 50 without using any energy to heat the fluid in the first cell 46 or second cell 48 until the fluid temperature drops to a predetermined minimum temperature, which is 230 degrees Fahrenheit in the illustration. As described earlier, the auto controller 22 will energize the heating elements 56 and 58 one at a time, changing from the first cell 46 to the second cell 48 in a predetermined cycle, such as a two minute as described in this example. It has been discovered that the cycling of the energizing of the first heating element 56 and the second heating element 58 facilitates maintaining the fluid temperature within a desired temperature range while reducing the energy necessary to do so.

Advantageously, because the second pump 52 moves the hot fluid from an upper area 48a of the second cell 48 and into the first cell 46. This circulation facilitates circulating the fluid within the heat pump 12 which enables the heat pump 12 to utilize heating elements 56 and 58 that operate with higher wattage to heat the fluid. This in turn facilitates faster recovery time for reheating the fluid after it has been circulated through the heat exchanger 14. As mentioned earlier, the tubular coils 66 and 68 pushes the fluid across the bottom of the first cell 46 and the second cell 48 rotating the fluid from the lower areas 46a and 48b of the first cell 46 and second cell 48, respectively, and upward toward the upper area 48a, thereby facilitating maintaining the temperature of the fluid even throughout the first cell 46 and second cell 48.

The auto controller 22 impulses the first and second heating elements 56 The auto controller 22 impulses the first and second heating elements 56 and 58 in two minute cycles until cell temperature settings are met, which also saves energy and facilitates heating the area 18 at approximately the rate that the area 18 is losing heat.

The inventor has found that the system 10 requires approximately 40% less energy to operate compared to electric heat pumps of the past. The typical electric heat pump of the past only changes air temperature, in to out, approximately 20 degrees Fahrenheit. The inventor's system 10 changes the air temperature, from in to out, approximately 42 degrees Fahrenheit in comparison. The following chart compares the minute run time in kilowatt hours used. In extreme cold weather, the traditional electric heat pump cannot keep up with the heating requirements. The system 10 according to the embodiments being described herein will continue performing and change the air temperature approximately 42 degrees Fahrenheit. In the illustration, air enters the furnace at approximately 70 degrees Fahrenheit and exits through a plenum (not shown) at approximately 112 degrees Fahrenheit.

In the illustration being described, the heating elements 56 and 58 are 3500 watt heating elements which put forth approximately 199.15 BTUs per minute in the fluid. When operating, the two minute heat cycle, therefore, generates approximately 398.3 BTUs. The heat exchanger 14 output in the same two minute cycle is approximately 1500 BTUs. It has been found that the fluid temperature of the fluid in the first and second cells 46 and 48 has to be between approximately 228 degrees Fahrenheit and 250 degrees Fahrenheit in order to supply the heat exchanger 14 with the heat needed to put out approximately 1500 BTUs per two minute cycle.

It has been found that this output is possible utilizing the features of the embodiment being described herein because the fluid is preheated or heated before it is pumped through the heat exchanger 14 and heated again before the fluid is reintroduced into the first cell 46 and the second cell 48.

The fluid returning from the heat exchanger 14 returns to the manifold 64 which delivers the fluid to the tubular coils 66 and 68. It should be understood that the first and second heating elements 56 and 58 heat the first and second tubular coils 66 and 68, respectively, to a temperature such that when the fluid passing through the first and second tubular coils 66 and 68 is delivered to the lower areas 46a and 48b of the first cell 46 and the second cell 48, the fluid is approximately 230 degrees Fahrenheit In the illustration being described, each of the first cell 46 and second cell 48 is approximately 5×7½×20 inches and has a storage capacity of 384 ounces of fluid therein. Consequently, both the first and second cells 46 and 48 store a combined 768 ounces of fluid. Note that the first pump 50 pumps approximately 3 gallons per minute in the example through the heat exchanger 14, which means that the first pump 50 is pumping approximately 384 ounces per minute through the heat exchanger 14. In the illustration being described, the heat exchanger 14 is a model number HX075-75,000 available from CT Wood Furnace at www ctwoodfurnace.com and has a capacity of approximately 48 ounces. Consequently, the fluid passing through the heat exchanger 14 is replaced approximately eight times (384 ounces/48 ounces). This means that the fluid in the heat exchanger 14 is replaced eight times per minute and reheated by the 240 inches of tubing coil provided by the first tubing coil 66 and second tubing coil 68 which as mentioned earlier are situated around the first and second heating elements 56 and 58, respectively.

As mentioned earlier in the illustration being described, when the thermostat 20 calls for heat during normal operations (i.e., after the fluid is already heated above a predetermined minimum temperature), the auto controller 22 will energize the first pump 50 to start pumping the heated fluid through the heat exchanger 14 and simultaneously energizes blower 16 to provide heat into the area 18, without energizing either of the heating elements 56 or 58 for a predetermined period of time or cycle, such as two to two and one half minutes. Accordingly, no energy is being used to heat the fluid, although heat is provided to the area 18. As mentioned earlier, when the temperature of the fluid in the first cell 46 or second cell 48 drops, equals or falls below the predetermined minimum temperature, which is 230 degrees Fahrenheit in the illustration being described, the auto controller 22 energizes the first heating element 56 to start operating, which adds heat to the fluid in the first cell 46 and to the first tubular coil 66. Substantially simultaneously the second pump 52 is energized to circulate fluid from the upper area 48a of the second cell 48 to the lower area 46a of the first cell 46. This causes the fluid temperature in both the first cell 46 and second cell 48 to increase and also circulates the fluid around the first and second heating elements 56 and 58 and their respective tubular coils 66 and 68. In the manner described earlier, the auto controller 22 alternately energizes each of the heating elements 56 and 58 in cycles, such as two minute cycles. It should be understood that this operation keeps the temperature of the fluid up without burning the fluid and lets the fluid expand more evenly in the first and second cells 46 and 48. It has been found that putting the BTUs in the fluid makes the fluid expand and increases the heat moving through the system 10.

It has also been found by the inventor that the heating system 10 will restore heat in the fluid faster than the heat exchanger 14 is removing heat from the fluid. Upon testing, it was found that the heat pump 12 was pulling approximately 14 amperes at 240 volts. Using the electric heat output formula: BTUH equals volts×amps×3.413, it was found that the input BTUH was equal to 11,468 BTUH. The cubit feet per minute output, using a conventional anemometer, was found to be approximately 996 CFM. Using a sensible heat transfer formula of: BTUH=CFM×TD(db)×1.08, it was found that the BTUH output at the area 18 was on the order of 996×40×1.08 or 45,179 BTUH. Accordingly, the heat pump 12 appeared to produce more BTUH output than BTUH input, thereby resulting in an appliance that was 393% efficient (45,179/11,468×100%).

Advantageously, the operation of the heating elements 56 and 58 and second pump 52 is independent of the blower 16 and first pump 50, which provides for more consistent and even heating. This operation reduces or eliminates the need for a variable speed blower, which are more expensive that constant speed blowers. Another experiment or test was performed wherein it was determined that the heat pump 12 generated 484 BTUs per minute using an input of 2 kilowatts per hour and generated an output of 8.5 kilowatts per hour.

Thus, it should be understood that the heat pump 12 according to the embodiment being described herein is extremely efficient when compared with heat pumps of the past. In one illustration, for example, the following efficiencies were found:

| TFD Multiple Cell Liquid Heat Pump System | | | |
|---|---|---|---|
| TFD | 6,600 KWH | Cost per unit .09 | Cost per 1 million btus 5.95 |
| Volts 220-240 | KW - See Chart Below | | |
| | Amps 14 - when operating with one heating element | | |
| | Amps 28 - when operating with 2 heating elements | | |

| Impulse Cycle Settings | | | | | |
|---|---|---|---|---|---|
| Minutes ON | | Minutes OFF | | | |
| Blower 16 and First Pump 50 | Blower 16 and First Pump 50 | Heating Minutes per Hour | KW-Used Hours | Est. Outside Temp. | Cost per Hour |
| 3 | 7 | 18 | 1.8 | 30°-up | .16 ¢ |
| 4 | 6 | 24 | 2.4 | 25° | .21 ¢ |
| 5 | 5 | 30 | 3.0 | 20° | .27 ¢ |
| 6 | 4 | 36 | 3.6 | 15° | .32 ¢ |
| 7 | 3 | 42 | 4.2 | 0° | .37 ¢ |
| 60 | 0 | 60 | 6.0 | | .54 ¢ |

The system was designed for an add-on to existing furnaces; gas, fuel oil or electric. The multiple cell liquid heat pump system can be installed in a freestanding portable heating unit. The multiple cell liquid heat pump system was installed in a furnace and was tested. Tests show the furnace performed at 393% efficiency. The high efficient multiple cell heat pump will perform using 35% less energy than an electric heat pump with gas or electric furnace backup.

Advantageously, the system and method according to the present invention provides even heating and a highly efficient heating system for maintaining the fluid in the heat pump 12 at a predetermined or desired temperature or within a predetermined or desired temperature range. The system and method are believed to be more efficient than the past because of the operation of the auto controller 22 and its control over the heating elements 56 and 58, the preheating of the fluid before it is returned to the first and second cells 46 and 48 and the energizing and control of the heating elements 56 and 58.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A heat transfer system comprising:
   a first cell (46) storing liquid and a second cell (48) storing liquid;
   a first heating element assembly (56, 66) associated with the first cell and a second heating element assembly (58, 68) associated with the second cell, wherein said first heating element assembly (56, 66) comprises a first tubular coil (66) situated about a first heating element (56), said first coil adapted to receive liquid from a heat exchanger (14) and to heat the received liquid before it is introduced into said first cell (46) and said second heating element assembly (58, 68) comprises a second tubular coil (68) situated about a second heating element (58), said second coil adapted to receive liquid from a heat exchanger (14) and to heat the received liquid before it is introduced into said second cell (48);
   a controller (22) adapted to independently energize each of said heating element assemblies (56, 66; 58, 68) when the temperature of liquid in the associated cell is below a first predetermined temperature; and
   a first pump (50) adapted to pump liquid from the first cell (46) to a heat exchanger (14) and from the heat exchanger to the first cell (46) via the first coil (66) and to the second cell (48) via the second coil (68), and a second pump (52) adapted to pump liquid from the second cell (48) to said first cell (46) in order to maintain a liquid temperature in said first cell (46) above a second predetermined temperature,
   wherein the liquid comprises a heat transfer oil which is liquid at temperatures of 220-250° F. and wherein the heat transfer system comprises a closed flow circuit for the liquid.

2. The heat transfer system of claim 1, wherein the first heating element assembly (56, 66) and the second heating element assembly (58, 68) are adapted to heat liquid before the liquid is pumped to the heat exchanger (14) and as the liquid returns from the heat exchanger to at least one of the cells (46, 48).

3. The heat transfer system of claim 2, wherein second pump (52) is adapted to pump liquid from the second cell (48) to a bottom area (46a) of said first cell (46).

4. The heat transfer system of claim 2, wherein each heating element assembly (56, 66; 58, 68) is adapted to preheat liquid before it mixes with liquid in the respective cell (46, 48) and substantially simultaneously heat liquid in the respective cell (46, 48).

5. The heat transfer system of claim 1, wherein each of said coils (66, 68) comprises an outlet (66a, 68a) situated toward a bottom area of the respective cell (46, 48).

6. The heat transfer system of claim 1, wherein said controller (22) is adapted to energize said heating element assemblies (56, 66; 58, 68) in a predetermined order.

7. The heat transfer system of claim 6, wherein said controller (22) is adapted to alternately energize said heating element assemblies (56, 66; 58, 68) when a temperature in at least one of the cells (46, 48) falls below a first predetermined temperature of 230° F.

8. The heat transfer system of claim 7, wherein upon a call for heat, said controller (22) is adapted to cause said first pump (50) to pump liquid through said heat exchanger (14) and said controller (22) is adapted to alternately energize heating element assemblies (56, 66; 58, 68) after a temperature of said liquid in at least one of said cells (46, 48) falls below said first predetermined temperature.

9. The heat transfer system of claim 6, wherein said controller (22) is adapted to alternately energize both of said heating element assemblies (56, 66; 58, 68) when a liquid temperature in at least one of said cells (46, 48) falls below a minimum predetermined temperature of 220° F.

10. A heat transfer system, comprising:
a heat exchanger (14);
a blower (16) in operative relationship with said heat exchanger;
a liquid tank (30) having a first cell (46) and a second cell (48), each cell containing a liquid comprising a heat transfer oil which is liquid at temperatures of 220-250° F.;
a first pump (50) adapted to pump liquid from said first cell (46) to said heat exchanger (14) and from said heat exchanger (14) to said first cell (46) and said second cell (48);
a second pump (52) adapted to circulate liquid from said second cell (48) to said first cell (46);
a first heating element assembly (56, 66) situated in said first cell (46) and a second heating element assembly (58, 68) situated in said second cell (48), wherein said first heating element assembly (56, 66) comprises a first tubular coil (66) situated about a first heating element (56), said first coil adapted to receive liquid from the heat exchanger (14) and to heat the received liquid before it is introduced into said first cell (46) and said second heating element assembly (58, 68) comprises a second tubular coil (68) situated about a second heating element (58), said second coil adapted to receive liquid from the heat exchanger (14) and to heat the received liquid before it is introduced into said second cell (48);
at least one sensor (70, 72) adapted to sense a temperature in at least one of said first cell (46) and said second cell (48);
a thermostat (20) operable to set a desired room temperature; and
a controller (22) coupled to said thermostat (20), said first pump (50), said second pump (52), said blower (16), said first heating element assembly (56, 66) and said second heating element assembly (58, 68), said controller (22) operable to respond to said thermostat (20) and to control said first heating element assembly (56, 66) and said second heating element assembly (58, 68) and said second pump (52) in order to maintain a temperature of said liquid in said liquid tank (30) within a predetermined temperature range.

11. The heat transfer system of claim 10, wherein said controller (22) is adapted to alternately energize said first heating element assembly (56, 66) and said second heating element assembly (58, 68) when a temperature sensed by said at least one sensor (70, 72) is less than or equal to a first predetermined temperature.

12. The heat transfer system of claim 10, wherein said controller (22) is adapted to energize at least one of said first heating element assembly (56, 66) or said second heating element assembly (58, 68) and said second pump (52) to maintain a temperature of said liquid in said second cell (48) and said first cell (46) within said predetermined temperature range.

13. The heat transfer system of claim 10, wherein said controller (22) is adapted to alternately energize said first heating element assembly (56, 66) or said second heating element assembly (58, 68) and said second pump (52) to maintain a temperature of said liquid in said second cell (48) and said first cell (46) within said predetermined temperature range.

14. The heat transfer system of claim 13, wherein said controller (22) is adapted to alternately energize said first heating element assembly (56, 66) and said second heating element assembly (58, 68) for a two minute period of time.

15. The heat transfer system of claim 13, wherein said controller (22) is adapted to simultaneously energize each of said first heating element assembly (56, 66) and said second heating element assembly (58, 68) when a liquid temperature falls below a minimum temperature.

16. The heat transfer system of claim 10, wherein said controller (22) is adapted to energize said first pump (50) and said blower (16) in accordance with a predetermined impulse cycle and in response to a thermostat setting.

17. The heating system of claim 10, wherein said controller (22) is adapted to energize said first pump (50) and said blower (16) independent of said first heating element assembly (56, 66) and said second heating element assembly (58, 68).

18. The heat transfer system of claim 10, wherein said controller (22) is adapted to alternately energize said first heating element assembly (56, 66) and said second heating element assembly (58, 68) if a temperature sensed by said at least one sensor (70, 72) falls below a predetermined lower operating temperature, until a temperature of said liquid reaches a predetermined upper operating temperature.

19. The heat transfer system of claim 18, wherein said predetermined lower operating temperature is 230° F. and said predetermined upper operating temperature is 250° F.

20. The heat transfer system of claim 10, wherein said controller (22) is adapted to simultaneously energize each of said first heating element assembly (56, 66) and said second heating element assembly (58, 68) when a temperature of said liquid in said second cell (48) or first cell (46) is less than or equal to a minimum temperature.

21. The heat transfer system of claim 10, wherein a dividing wall (36) separates the first cell (46) and the second cell (48) and the dividing wall (36) is provided with at least one opening (40) in a lower portion of the dividing wall (36).

22. The heat transfer system of claim 10, wherein the second pump (52) is operable to deliver liquid from an upper portion (48a) of the second cell (48) to a lower portion (46a) of the first cell (46).

23. The heat transfer system of claim 10, further comprising a safety liquid level control (74) operable to monitor the liquid level in the liquid tank (30), wherein the safety liquid level control (74) is coupled to the controller (22) and is operable to generate a low level signal to the controller (22) if the liquid level drops below a predetermined minimum liquid level, and wherein the controller (22) is operable to turn off the first pump (50), the second pump (52), and the heating element assemblies (56, 66; 58, 68) when it receives the low level signal from the safety liquid level control (74).

24. The heat transfer system of claim 10, wherein liquid level in the first and second cells (46, 48) is between a minimum liquid level (80) and a maximum liquid level (82).

25. The heat transfer system of claim 10, wherein a wall (30*e*) of the first cell (46) is provided with a plurality of baffles (84) operable to facilitate circulation of liquid toward the first heating element assembly (56, 66) as the liquid is introduced in the first cell and before the liquid is delivered to the heat exchanger (14).

* * * * *